US011587085B2

(12) United States Patent
Wang (10) Patent No.: US 11,587,085 B2
(45) Date of Patent: Feb. 21, 2023

(54) VENDING MACHINE (71) Applicant: SmartComm Electronics Pte. Ltd., Singapore (SG)

(72) Inventor: Haiwei Wang, Singapore (SG)

(73) Assignee: SmartComm Electronics Pte. Ltd., Singapore (SG)

(*) Notice: Subject to any disclaimer, the term of this patent is extended or adjusted under 35 U.S.C. 154(b) by 308 days.

(21) Appl. No.: 16/637,139

(22) PCT Filed: Oct. 20, 2017

(86) PCT No.: PCT/SG2017/050526
§ 371 (c)(1),
(2) Date: Feb. 6, 2020

(87) PCT Pub. No.: WO2019/032043
PCT Pub. Date: Feb. 14, 2019

(65) Prior Publication Data
US 2020/0273042 A1 Aug. 27, 2020

(30) Foreign Application Priority Data

Aug. 7, 2017 (CN) .......................... 201720976111.5

(51) Int. Cl.
*G06Q 20/18* (2012.01)
*G06Q 20/40* (2012.01)
(Continued)

(52) U.S. Cl.
CPC ....... *G06Q 20/40145* (2013.01); *G06Q 20/18* (2013.01); *G06V 40/166* (2022.01); *G07F 9/009* (2020.05); *G07F 9/026* (2013.01)

(58) Field of Classification Search
None
See application file for complete search history.

(56) References Cited

U.S. PATENT DOCUMENTS 6,386,323 B1 * 5/2002 Ramachandran ..... G07F 19/203
705/16
7,464,867 B1 * 12/2008 Kolls ..................... G06Q 30/06
235/449

(Continued)

FOREIGN PATENT DOCUMENTS

CN 105825583 A 8/2016

OTHER PUBLICATIONS

International Search Report for PCT/SG2017/050526 dated Jan. 25, 2018.

(Continued)

*Primary Examiner* — William J Jacob
(74) *Attorney, Agent, or Firm* — Idea Intellectual Limited; Margaret A. Burke; Sam T. Yip (57) ABSTRACT

A vending machine comprises a shelf for holding goods; an automatic payment terminal connected to the shelf for receiving payment of selling the goods; and at least one biometric reader that is connected to the automatic payment terminal for performing electronic bill payment of the goods. A method of selling goods automatically comprises step of providing goods on a shelf of a vending machine; reading biometric data of a user in order to identify the user; processing payment of the user according to the biometric data; and releasing the goods after receiving the payment.

5 Claims, 5 Drawing Sheets

(51) Int. Cl.
*G07F 9/00* (2006.01)
*G07F 9/02* (2006.01)
*G06V 40/16* (2022.01)

(56) References Cited

U.S. PATENT DOCUMENTS

| | | | | |
|---|---|---|---|---|
| 2002/0022966 | A1* | 2/2002 | Horgan | G06Q 20/02 |
| | | | | 705/35 |
| 2004/0153421 | A1 | 8/2004 | Robinson | |
| 2006/0193004 | A1* | 8/2006 | Wasilewski | H04N 1/00193 |
| | | | | 358/1.15 |
| 2008/0028455 | A1* | 1/2008 | Hatter | G06Q 20/389 |
| | | | | 726/10 |
| 2010/0265038 | A1* | 10/2010 | Beenau | G06Q 20/40145 |
| | | | | 340/5.83 |
| 2014/0195377 | A1* | 7/2014 | Kraft | G06Q 30/0278 |
| | | | | 705/26.35 |
| 2015/0134107 | A1* | 5/2015 | Hyde | G16H 20/13 |
| | | | | 700/237 |
| 2016/0012465 | A1* | 1/2016 | Sharp | G06Q 20/321 |
| | | | | 705/14.17 |
| 2016/0155127 | A1 | 6/2016 | Hartman | |
| 2016/0155156 | A1* | 6/2016 | Gopal | G06Q 30/0236 |
| | | | | 705/14.66 |
| 2016/0162895 | A1* | 6/2016 | Nuzum | G06Q 20/40145 |
| | | | | 705/44 |
| 2017/0323278 | A1* | 11/2017 | Unnerstall | G06Q 10/087 |

OTHER PUBLICATIONS

Written Opinion of the International Searching Authority for PCT/SG2017/050526 dated Jan. 25, 2018.

* cited by examiner

VENDING MACHINE

GROSS-REFERENCE TO RELATED APPLICATIONS

This application is a national stage application (under 35 U.S.C. § 371) of PCT/SG2017/050526, filed Oct. 20, 2017, which claims benefit of Chinese Application No. 201720976111.5, filed Aug. 7, 2017, both of which are incorporated herein by reference in their entirety.

The present application claims a filing date of Chinese Utility Model application number 2017 2097 6111.5 with a title of Automatic Vending Machine that was filed with SIPO (State Intellectual Property Office of People's Republic of China) on 7 Aug. 2017 as its priority date. All contents or relevant subject matter of the priority application are hereby incorporated entirely or wherever appropriate by reference.

The present application relates to a vending machine or automatic vending machine. The vending machine is also known as an automated retail kiosk or self-service kiosk, standalone kiosk. The application also relates methods for making, assembling, disassembling, installing, configuring, maintaining and using the vending machine.

A vending machine is an automated machine that provides items such as snacks, beverages, alcohol, cigarettes and lottery tickets to consumers after money or a credit card is inserted into the machine. Traditionally, vending machines are located in factories, office buildings, bowling alleys and other high traffic locations. Vending machine operators have found that strategic location of vending machines in high traffic areas regularly frequented by the same customers, promote habitual sales and brand loyalty. As a result, vending machines have proved successful automated devices for sales of goods to customers.

Most vending machines are non-interactive and serves as a passive transactional dispensing machine. In order to gain market share in the vending machine business, vending machine not only has to provide a myriad variety of relevant products but also to capture customers' buying habits and behaviors providing the relevant products to these customers. Another problem faced in the vending machine is the failure to keep machines stocked which often results in loss of customer loyalty, thereby detrimentally affecting sales. When purchasing goods from a vending machine, a user or customer often has to provide payment by inserting coins, bank notes or credit cards into a payment terminal of the vending machine, which also known as a point of sale terminal, credit card terminal, EFTPOS terminal or a PDQ terminal in East Africa. Collection and verification of genuine payment at a vending machine often proves to be troublesome.

The present invention aims to provide a new and useful vending machine. The invention also aims to present new and useful methods for making, assembling, installing, repairing, upgrading, modifying, configuring and using the vending machine. Essential features of the vending machine are provided by one or more independent claims, whilst advantageous features of the vending machine are presented by their dependent claims respectively.

According to a first aspect, the present application provides a vending machine that comprises one or more shelves for holding goods; an automatic payment terminal connected to the shelf for receiving payment of selling the goods; and one or more biometric readers of security identification and authentication, which are connected to the automatic payment terminal or the shelf for performing electronic bill payment of the goods. The vending machine also includes interactive kiosks, such as telekiosks, financial services kiosk, photo kiosk, digital order stations, instant print stations. internet kiosks, ticketing kiosk, movie ticket kiosk, restaurant kiosk, DVD vending kiosk, etc.

The shelf is open or closed for stacking or holding the goods. For instance, the open shelf includes a touchscreen for displaying options of purchase. Examples of the closed shelf include a vending machine cabinet that has a transparent front panel. The automatic payment terminal includes a point of sale terminal, a credit card terminal, a EFTPOS terminal or a PDQ terminal in East Africa, which interfaces with payment cards to make electronic funds transfers. Examples of the automatic payment terminal further include customised payment components, such as coin hoppers, bill acceptors, cash validator, card readers and thermal printers. The one or more biometric readers include biometric devices that deploy automated methods of verifying or recognising personal identity of the user based on a physiological or behavioural characteristic, which include fingerprints, facial images, Iris prints and voice recognition. The vending machine of the present application provides convenience of identifying the user (e.g. customer of the vending machine) automatically, efficiently, quickly and accurately. In contrast, known vending machines have no information of the user such that all its customers are treated similarly, being paymasters of the vending machine. Payment process of the known vending machines is typically long and tedious, often involving coins and bank notes. Operators of the known vending machines have to replenish the known vending machines and collect payment at the known vending machines regularly, which is time consuming, labour intensive and risky at times.

The vending machine can further comprise a communication unit (e.g. network interfaces, network interface controller) that is connected to the automatic payment terminal, the one or more biometric readers, or both the automatic payment terminal and the one or more biometric readers for transferring data between the vending machine and a remote computer. The communication unit is able to transmit the data by cable(s) or wirelessly. For example, the communication unit can communicate with other electronic devices wirelessly by radio waves, sound waves or infrared light. Optionally, the communication unit includes one or more modems (modulator-demodulators) that is able to transmit and/or receive electronic signals of 2G (second-generation wireless telephone technology), 3G (third generation of wireless mobile telecommunications technology), 4G (fourth generation of mobile telecommunications technology), LTE Advanced Pro (LTE-A Pro, also known as 4.5G, 4.5G Pro, 4.9G, Pre-5G, 5G Project, and so on), 5G (5th generation mobile networks or 5th generation wireless systems) or more advanced generations. The communication unit can have one or more antennas that facilitate other types of wireless communication, such as BLUETOOTH wireless communication (using short-wavelength UHF radio waves in the ISM band from 2.4 to 2.485 GHz), ZIGBEE wireless communication (IEEE 802.15.4-based specification). The communication unit includes a wired communication unit (e.g. ADSL modem) so that existing infrastructure (e.g. telephone network) is readily utilised.

If adopting the wireless data transmission, the communication unit is configured to communicate (e.g. broadcast) with a mobile electronic device of the user automatically, according to identification of the user, possibly obtained by the one or more biometric reader. For example, the communication unit is able to transmit text messages (e.g. Short Message Service), images (e.g. promotion voucher) or alert signals (e.g. ringing tones or beeps) to the mobile electronic device (e.g. smartphone) if detecting close presence of the user.

The communication unit can additionally include an encrypter or encoder that deploys cryptography to protect the data transferring. In one instance, the communication unit employs a pseudo-random encryption key generated by an algorithm so that only an authorized recipient can decrypt the data with a suitable key provided by an originator to recipients, but not to unauthorized users or interceptors. The communication unit can also comprise a buffer or data buffer for storing data temporarily when operating the automatic payment terminal, the biometric reader or both.

The vending machine or the communication unit may comprise one or more electronic identities, or a single unique electronic identity for identifying the vending machine, the automatic payment terminal or both the vending machine and the automatic payment terminal. The electronic identity is also known as an identification number (e.g. serial number, identifier) or an electronic identification number that provides identity or a unique name of the vending machine or the communication unit, which may be automatically accessed or read by other electronic devices (e.g. computer, barcode reader). The identification number or electronic identification number can be associated with characteristics of the vending machine or its goods (i.e. products) so that an operator of the vending machine is able to monitor operation of the vending closely, replenishing goods or repairing components upon receiving request from the vending machine, whether manually or automatically. For example, the identification of the vending machine is linked to a geographical location of the vending machine so that the operator can provide precise location of the vending machine to a supplier for refilling the vending machine timely.

The identification of the vending machine or the communication unit offers a unique identifier or unique electronic identifier for vending machine or the communication unit of the vending machine. The unique identifier comprises a barcode, a serial number, a machine readable code, a QR (Quick Response) code, an IP (Internet Protocol) address (e.g. IPv4 address, IPv6 address), a MAC (Media Access Control) address, an IMEI (International Mobile Equipment Identity) number, a Wi-Fi address, a digital identity, an electronic address by hardware (e.g. screw position of a terminal block) or software (e.g. digital address "01", "11"). The electronic address in the software form includes digital addresses that are possibly recorded or programmed in a memory of the vending machine or the communication unit. The vending machine can further be locked or unlocked remotely for receiving goods replenishing or disposing expired goods. One or more electronic addresses may be used as the identity or electronic identity of the vending machine.

The vending machine can further comprise a recorder, a tracker or stork taker for recording stock or transaction of the goods on the shelf. For example, the recorder includes a scanner on a chute of the vending machine. The scanner is connected to a computer of the vending machine so that every outgoing goods is scanned and recorded by the computer, which keeps records of goods sold as existing the chute linking to a product dispenser (also known as take-out port) of the vending machine. The recorder, tracker or stork taker is possible to be implemented by hardware components, software programs or both, whether connected to a local computer or a remote computing server. Of course, the recorder, tracker or stork taker is possible to take stock of incoming goods, outgoing goods or both so that the vending machine has an updated records of available goods, possible to send request of goods replenishment when necessary.

The recorder optionally comprises a label dispenser for providing labels to the goods. The labels are optionally affixed to the goods respectively, such as by adhesive, laser marking (e.g. laser engraving). The labels provide machine-readable identification information (e.g. on stickers) to the goods so that information of the goods, vending machine and/or user (e.g. purchaser or customer) are able to be registered, tracked, compiled and/or analysed. The present vending machine thus is able to monitor handling of the goods, whether places of origins, manufacturing dates, nutrition information, user profile, customer preferences, storage time at the vending machine, quantity and prices of the goods, or any other information relating to sale or handling of the goods. In fact, a label is sometimes provided to a product upon loading into the vending machine and a user is able to scan the label upon purchase in order to find out information of the product, such as date of expiry of the product, user guide of the product and packaging disposal information of the product. The label dispenser is either standalone or connected to other components of the vending machine, including the one or more shelves, the automatic payment terminal and the one or more biometric readers. For instance, the label dispenser comprises a matrix barcode (e.g. Quick Response Code) printer for attaching a printed copy of the matrix barcode to at least one of the goods.

Embodiments of the application or invention(s) provides that the one or more biometric readers comprise a facial recognition system for identifying or verifying the user. The facial recognition system includes hardware and software related products or applications capable of identifying or verifying a person from a digital image or a video frame from a video source. One of the ways to perform facial recognition by the facial recognition system is by comparing captured facial features of the user with a face database. For example, the facial recognition system includes a sensor that comprises two parts: a dot projector for projecting more than 36,000 infrared dots onto the user's face, and an infrared camera for scanning, capturing or reading a pattern of the projected dots. The pattern is sent to a secure enclave in a 64-bit ARM-based system on a chip (e.g. A 11 Bionic chip), which contains a dedicated Artificial Intelligence accelerator to confirm a match with registered and authorised face.

In practice, the one or more biometric readers comprise a primary biometric reader for security identification and payment authentication of a user. The primary biometric reader comprises one or more cameras (e.g. still camera, video camera, thermal camera) for recognising facial features in order to identify a person or customer. The one or more primary biometric readers additionally comprise different types of biometric readers, such as a chemical biometric reader (e.g. by analysing segments of DNA of the user to grant access), a visual biometric reader (e.g. by iris recognition, face recognition, finger recognition and retina recognition), a behavioural biometric reader (e.g. gait analyser), an olfactory biometric reader, an auditory biometric reader, or a combination of any of these biometric readers.

The vending machine additionally comprises a secondary identifier or identification reader that is able to verify and prove true or false of the primary biometric reader. For example, the secondary identifier includes a telephone module for sending text messages to a smartphone of the user. The telephone module is able to send a onetime password (OTP) to the smartphone so that the user is able to enter the OTP to the vending machine when purchasing the goods. A mobile phone number of the user is automatically supplied to the telephone module according to identification information of the user by the facial recognition system. The secondary identifier optionally comprises one or more biometric readers as a secondary biometric reader for verifying identification of the users, in addition to the primary biometric reader. The secondary biometric reader may be a type different from the primary biometric reader. The primary biometric reader and the secondary biometric reader sometimes share part of information captured by them. For example, the primary biometric reader is a facial recognition system, whilst the second biometric reader is an iris recognition system that share an image of the user, as illuminated by the illuminator projecting light of near infrared wavelength band (NIR: 700-900 nm) of the electromagnetic spectrum.

The facial recognition system comprises an illuminator (e.g. infrared illuminator or flood illuminator) for identifying the user in the night. The illuminator, whether for projecting visible or invisible light (e.g. infrared light), expands usage or enhance accuracy of the facial recognition system so that the vending machine is able to work both indoors and outdoors, whether in daylight or poor lighting.

The vending machine can additionally comprise a computer connected to the one or more biometric readers. The computer having or installed with a customer relationship management program that is able to utilise personal identification information associated with the user as identified by the one or more biometric readers, a primary identifier (e.g. the one or more biometric reader) and/or the secondary identifier. The customer relationship management program has one or more databases that keep various types of information of the identified user so that the vending machine is able to interact with the user appropriately. For example, the customer relationship management program provides nutrition information onto a display screen of the vending machine relating to a purchased goods of the user so that the user is informed benefit and guide of consumption of the purchased goods. The customer relationship management program is further able to store price, quantity, place of purchase of the goods locally or remotely to a computing server. The vending machine or the remote computing server can perform data analytics in order to optimise user experience and operation of the vending machine. For example, the customer relationship management program is able to reward the user automatically by sending vouchers after the purchase in order to encourage loyal customers, whilst information of the user is identified by the primary identifier, the secondary identifier or the one or more biometric readers (whether primary or secondary). Hence, the vending machine or the customer relationship management program of the vending machine is able to share identification information of the user with the automatic payment terminal so that the vending machine or an operator of the vending machine can enhance purchase experience of the user, and sales of the vending machine. For example, an operator of the vending machine is able to provide more alcohol to vending machines in areas of higher purchase interest or turn over.

The one or more shelves comprise one or more ejectors (e.g. coil feeder) for releasing the goods automatically after clearing payment at the automatic payment terminal. For example, the ejector includes a crane for lifting a purchased toy as goods to a chute for retrieval by the user or customer. The one or more ejectors are optionally operated by the user to choose or pick a product from the shelf so that the user will not only enjoy purchase, but also gaming experiences.

According to a second aspect, the present application provides a method for selling goods automatically by a vending machine. The method comprises a first step of providing goods on a shelf of a vending machine; a second step of reading biometric data of a user or customer by a primary and/or secondary biometric device (e.g. facial recognition system) in order to identify the user uniquely; a third step of processing payment of the user according to the biometric data; and a fourth step of releasing the goods after receiving payment from the user. One or more of these steps are optionally combined, changed in sequence or divided. In contrast to known techniques of purchasing by cash or credit card, the vending machine is able to recognise or identify its users by their biometric features (e.g. facial recognition) immediately so that the users can enjoy purchase without handling payment himself (e.g. by cash or credit card), whilst money transaction of the user purchased goods is performed is the background automatically and securely. Since the vending machine is able to identify a user precisely (e.g. at a distance of 12 metres away), the vending machine makes purchasing of the user almost effortlessly, without compromising security of payment or time of purchase.

The method can further comprise a step of sharing (e.g. transmitting) the biometric data of the user with a customer relationship management program (e.g. installed on a remotely connected computer server having broadband connection with a computer of the vending machine). In other words, the customer relationship management program of the vending machine is able to share user identification information with an automatic payment terminal of the vending machine so that the vending machine becomes intelligent, inactive, and helpful to the user.

Although hardwired connection (e.g. Ethernet cable connection) with the vending machine is desired, the method also optionally further comprises a step of transmitting the biometric data to a remote computing server wirelessly for processing, such as via one or more telecommunication networks (e.g. computer networks, the Internet, the telephone network, the global Telex network, the aeronautical ACARS network). Hence, multiple vending machines at different locations are able to connect the same remote computing server so that data of many customers or users are able to be compiled, analysed and utilised for improving sales at the one or more vending machines. The user does not even have to perform purchase in order to feedback data into the vending machine. For example, the vending machine is able recognise the user whenever the user passing by so that the vending machine is able to send alert messages (e.g. promotion advertisements) to a smartphone of the user at predetermined time slots or locations.

The method may further comprise a step of providing a unique or non-unique electronic identification of the vending machine to the remote computing server, to a mobile electronic device (e.g. smartphone) of the user or to a technician. For example, part or full identification of the user or his account(s) is able to be shared by the automatic payment terminal and one or more Customer Relationship Management (CRM) programmes. Information of the unique or non-unique electronic identification is able to be handled by a credit card company, a bank, a third-party mobile, an online payment platform (e.g. Alipay, or Zhifubao in Chinese) or an online payments system (e.g. PayPal™), which facilitate fast, reliable, secure and easy transaction at the vending machine. When communicating with the user, the CRM programmes or the vending machine optionally adjusts a user interface (e.g. touchscreen display, speaker) of the vending machine according to personal traits, preferences, gender, age, nationality, native language, geographical location, weather, seasons or any other personal or environmental factors, in order to provide useful and enjoyable experience to the user. For example, the vending machine provides an image of young lady talking with clear and distinctive voice when receiving a middle aged businessman. The vending machine alternatively shows one or more cartoon images (e.g. Tom and Jerry) if the CRM programme recognises the user to be a child. The vending machine may further increase its volume at its speaker when dealing with hearing impaired users of the vending machine (i.e. customers).

The method can additionally comprise a step of recording stock, product transition or money transaction of the goods in relation to the biometric data, especially with the customer relationship management program or the electronic identification of the vending machine. The vending machine is enabled to monitor its stork condition so that an operator of the vending machine is alleviated from frequent visitation or unnecessary stock replenishment at the vending machine. Cost of operating the vending machine is greatly reduced, bringing benefit to both users and operators.

Embodiments of the method further comprise a step of dispensing a visible or invisible label (e.g. a matrix barcode, a two-dimensional barcode or a Quick Response Code) to at least one of the goods. The label may be unique or non-unique so that a scanner or reader of the vending machine is able to obtain information sold goods when the sold goods departs from the shelf. Alternatively, a technician or employee of the vending machine operator has a handheld printer that can dispense the labels to the goods (e.g. sticking, adhering or affixing) when replenishing the vending machine. The reader or scanner of the vending machine observes the labels as means of monitoring the goods regularly, repeatedly or upon selling.

The method can further comprise a step of communicating with the user directly (e.g. presenting multimedia information on a touchscreen of the vending machine) or with a mobile electronic device of the user indirectly. The vending machine thus becomes more interactive, possibly more entertaining and user friendly. The vending machine is able to communicate with the user individually, or multiple users together (e.g. broadcasting). Images, voices, music or text messages are useful means of interaction.

Particularly, the reading of biometric data of a user can comprise recognising facial feature of the user in order to identify the user. The farcical features are easily captured and recognised whenever the user stands in front of one or more cameras of the vending machine, requiring no effort or additional action of the user. The user may even speak to the vending machine when purchasing, which provides a secondary means of personal identity verification of the user. In other words, the method provides simple, reliable, secure and intuitive means to purchase at the vending machine, requiring no human worker associated cost. For example, users of the vending machine will not feel shy when purchasing condoms at the vending machine.

The method may further comprise a step of verifying identity of the user electronically, such as by a secondary biometric data recognition, a PIN (personal identification number), a OTP (one-time password), which are known as secondary verification means, as compared to the primary means of verification at the vending machine. The primary and secondary identification techniques support and verify each other so that risk of erroneous transaction or fraudulent purchase is substantially reduced.

The method optionally further comprises a step of providing personalised information (e.g. healthcare data, nutrition information of the goods, recommending goods) to a mobile electronic device of the user. The vending machine thus becomes an assistant to the user, more than merely a machine for selling goods.

The accompanying figures (Figs.) illustrate embodiments and serve to explain principles of the disclosed embodiments. It is to be understood, however, that these figures are presented for purposes of illustration only, and not for defining limits of relevant inventions.

Exemplary, non-limiting embodiments of the present application will now be described with references to the above-mentioned figures.

Figure 1:
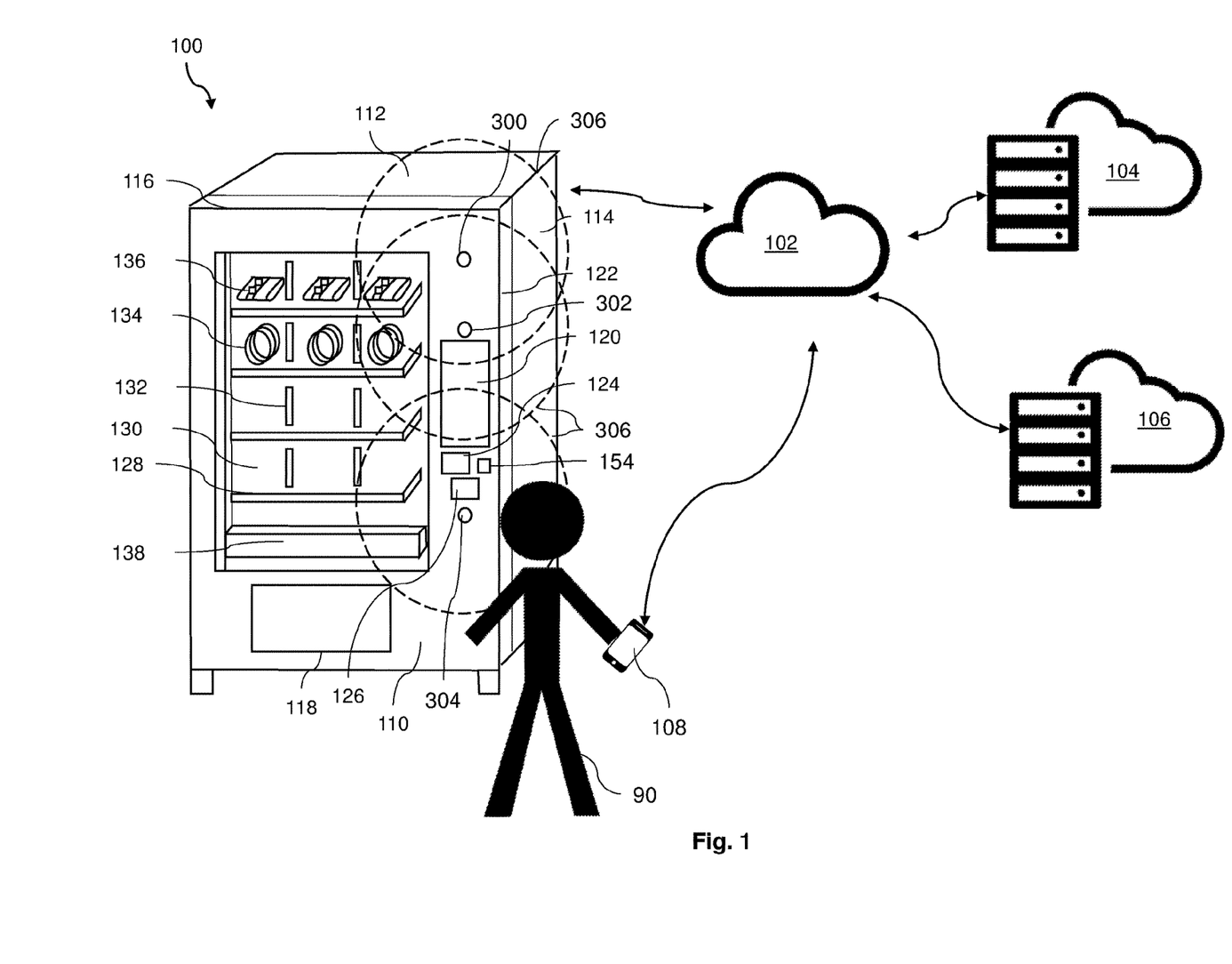
FIG. 1 illustrates an embodiment of a vending machine communicating with at least one remote cloud server.

FIG. 1 illustrates a facial recognition enabled vending machine 100 communicating with at least a remote cloud server 102, 104, 106 and a mobile device 108 held by a human user 90. A service provider 102 is commonly represented by a telco like Singtel, Starhub or M1 if based in the context of Singapore. The service provider 102 provides a communication infrastructure (wired or wireless communication). The communication infrastructure enables communications of the vending machine 100 and the mobile device 108 with a remote payment gateway 104 and a remote server of the vending machine owner 106. The vending machine 100 and the mobile device 108 held by the human owner is commonly in close proximity in a location. The human user 90 holding the mobile device 108 can effect communication with the remote cloud server 102, 104, 106 independently. The human user 90 holding the mobile device 108 can effect a communication with the vending machine 100 too using BLUETOOTH wireless communication, Infrared or other contactless technology. One way is by placing the mobile device 108 in proximity to a reader module 124. The vending machine 100 communicates with the remote server 102, 104, 106 via a wired connection typically a CAT 6 (Category 6) twisted pair cable terminated by a RJ45 (Registered Jack 45) connector and plugged into a corresponding RJ45 socket mounted on a wall. There can be variants of the cable like CAT 5 and CAT 5e depending on the demand of the speed of the data flow. The choice for using wired connection is the reliability and security of data transmission.

The connection to the remote cloud server 102, 104, 106 can be a wired connection or a wireless connection from the vending machine 100 via a service provider 102 to the remote cloud server 102, 104, 106 belonging to an owner of the vending machine 106. The smart phone 108 held by the buyer 90 is used as a payment tool for the product purchased from the vending machine 100. The smart phone 108 payment is effected through the monthly smart phone 108 bill charged by the service provider 102 subscribed by the buyer 90.

The vending machine 100 has a three-dimensional metallic rectangular chassis comprising a front panel 110, a top panel 110, a rear panel, a left side panel, a right side panel 114 and a base panel. The left side panel and the right side panel are determined as seen from the front panel 110. The vending machine 100 is constructed to have an approximate height of about 1.9 metres with a length of 1.2 metres and a width of 0.9 metres. The 1.9-metre height excludes ground contacting element like support stands or castors.

The front panel 110 has a transparent, clear plastic cover extending two-third of the length 116 of the vending machine disposed to the left side panel. The transparent, clear plastic is waterproof and heat resistant to withstand the outdoor environment. Below the transparent plastic is a collection chute 118. A tactile display screen 120 is located at the right of the front panel 110. Below the tactile display screen 120 is a reader module 124 comprising a contactless card reader using NFC (near field communication). Below the reader module 124 is a number keypad 126. The front panel 110 has three cameras lined up vertically in a straight line. A top camera unit 300 is aligned with the top plastic cover. A middle camera unit 302 is above the tactile display screen 120. A bottom camera unit 304 is below the number keypad 126. Each camera has a conical line of sight projecting from the lens of the camera as depicted by three circular broken lines 306.

The front panel 110 is a front panel door 122 that is supported by a hinge. The hinge attaches to the edge of the left side panel and the front panel door 122. The base panel having a plurality of support stands. The rear panel having a power socket and a ventilation louvre (not shown).

The interior of the vending machine 100 comprises a controller unit, a storage unit 142, a dispensing unit 144 and a power bank 146.

Figure 2:
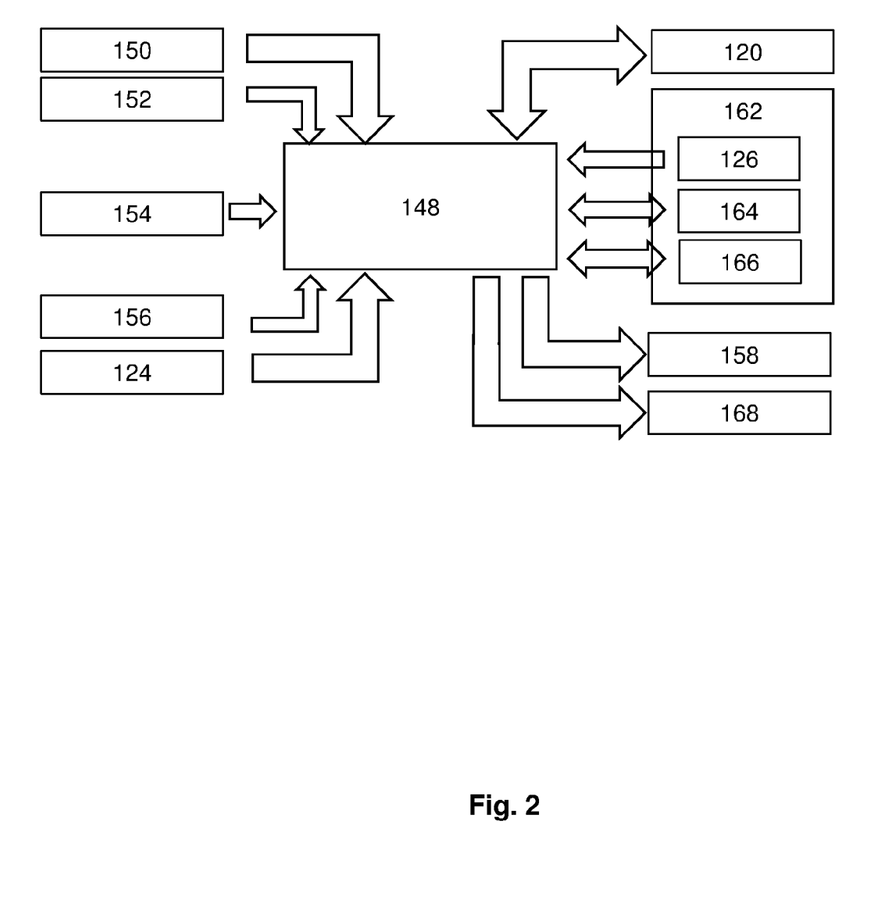
FIG. 2 illustrates a schematics of a controller unit of the vending machine.

FIG. 2 illustrates a schematic of the controller unit which has a computer 148 connected to a plurality of sensor 150, 152, 154, 156, the tactile display screen 120, a printer 158, an applicator 168, the reader module 124, and a communication module 162. The communication module 162 has a number keypad 126, a Network Interface Card (NIC) 164 and a Universal Serial Bus (USB) 166.

The computer 148 resides in the three-dimensional metallic rectangular chassis. The computer 148 has a processor (Intel i7 processor), a memory storage (DDR-RAM, ROM) and other surface mounted electronic components (connectors) mounted on a printed circuit board also known as a motherboard. The motherboard communicates with external peripherals located on the front panel 110 of the chassis.

The external peripherals include input and output peripherals. The input peripherals comprising a plurality of photoelectric sensor 150, a plurality of temperature sensor 152, a plurality of image sensor 154, a plurality of audio sensor 156, the tactile display screen 120, the reader module 124 and the communication module 162. The number keypad 126 of the communication module 162 is an input peripheral.

The output peripherals share a number of the same input peripherals comprising the tactile display screen 120 and the communication module 162. The printer 158 and the applicator 168 are output peripherals.

The photoelectric sensor 150, the plurality of image sensor 154, the plurality of audio sensor 156, the tactile display screen 120, the reader module 124 and the number keypad 126 are installed on the front panel 110 allowing an interaction between the buyer 90 and the vending machine 100.

The plurality of temperature sensor 152 is installed along the periphery of the vending machine 100 as well as internally. The communication module 162 are installed inside the vending machine 100 which can only be accessed by authorised personnel.

The vending machine 100 has a storage unit 142 which comprises a plurality of level 128, a plurality of channel 130 at the said levels 128 and the chassis. The chassis has a front panel door 122 and a collection chute 118. The chassis houses the storage unit 142, a dispensing unit 144, the controller unit and the power bank 146. The front panel door 122 forms part of the chassis with the collection chute 118 positioned at the lower part thereof.

The vending machine 100 also has a dispensing unit 144 which comprises a plurality of coil 134, a plurality of conveyor belt 136, an elevator arm 138 and a drive assembly 160. The coil 134 and the conveyor belt 136 are connected to the respective drive assembly 160 at the individual channels 130. The one end of the elevator arm 138 is attached to a pulley guided by a vertical rail located at the left side panel. The opposite end of the elevator arm 138 is not enclosed. The horizontal elevator arm 138 travels on a vertical axis along the rail and is able to stop at the four different levels 128.

The computer 148 of the controller unit controls the drive assembly 160 and the elevator arm 138 through electrical connections in the vending machine 100.

The vending machine 100 has four levels 128. The levels 128 are flat horizontal surfaces that extend from the left to the right. The levels 128 are static in their positions. The number of channels 130 are determined by the number of couplers at the rear end of the channels 130. There may be ten couplers equating to ten channels 130. Each channel 130 is demarcated by erecting partitions 132 along the level 128. The coupler which is not shown is configured to couple with a drive assembly 160. The coupler is a wire connector.

Each level 128 has three channels 130. In each channel 130, there can exist either a coil 134 or a conveyor belt 136. The drive assembly 160 is positioned behind each channel to drive the coil 134 or the conveyor belt 136. In FIG. 1, the top level also known as level 1 has three channels 130 in which each channel 130 has the conveyor belt 136. The level below the top level is known as level 2 has three channels 130 in which each channel 130 has the coil. Level 3 and 4 are vacant. All the four levels have partitions 132 segregating the channels 130.

Figure 3:
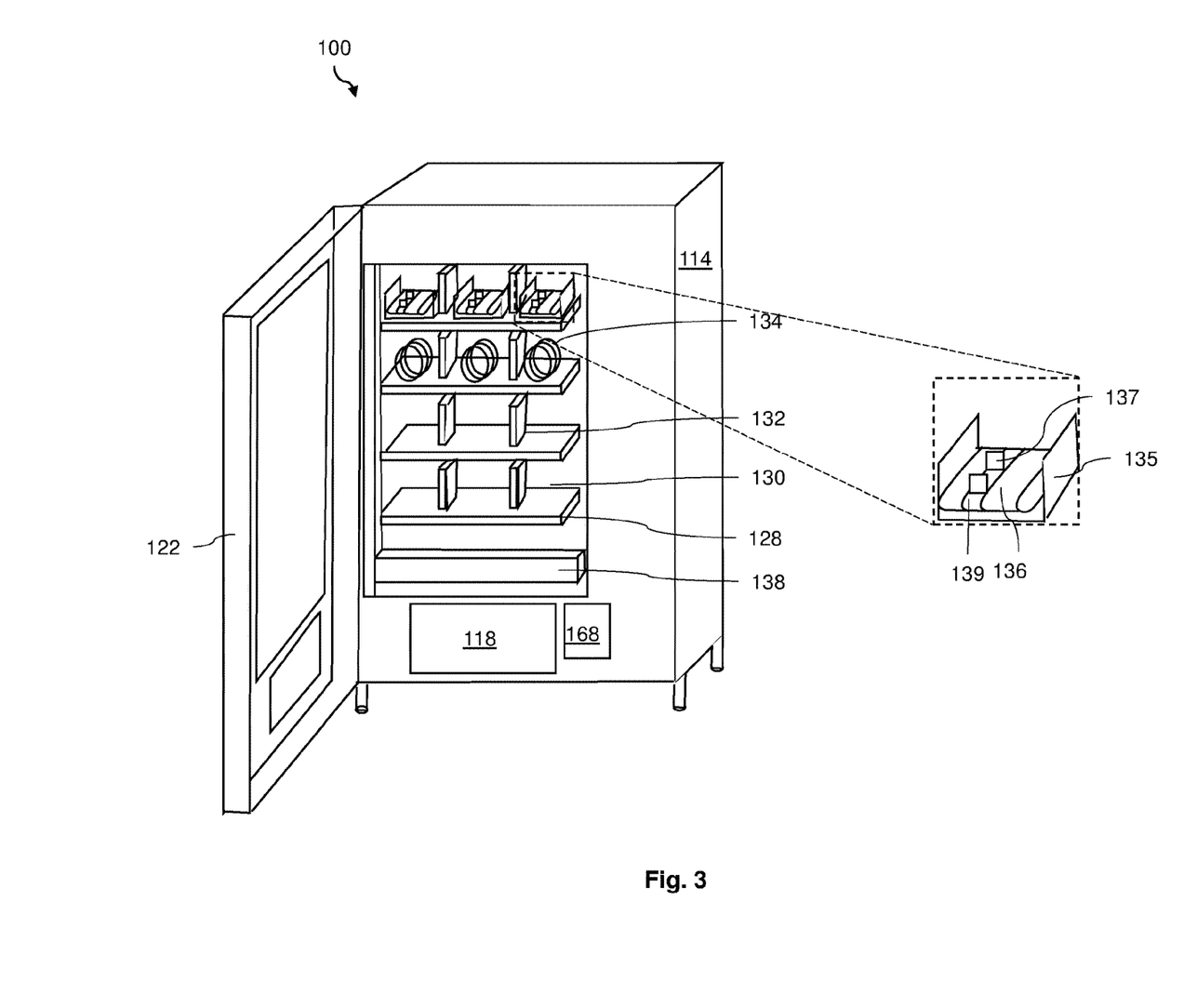
FIG. 3 illustrates a channel of a storage unit.

The channel 130 has a tray 135. The tray 135 comprises a plurality of slot 137 and a strip 139. The strip 139 runs along the tray lengthwise parallel with the channel 130. On the strip 139 are a plurality of clamp that holds a divider to demarcate the width of individual slot 137.

The power bank 146 (not shown) comprises an uninterrupted power supply (UPS) and an electrical supply from the mains to the uninterrupted power supply. The power bank is located inside the vending machine 100.

A plurality of vending machine 100 can be connected to the network and managed by the remote server 106 belonging to the owner of the vending machine(s) 100. The product inventory of all the vending machines 100 are monitored by the owner 106. Vending machine with low product stock will be highlighted and replenished in a short time. The owner 106 can also monitor the sales turnover of every vending machine 100 and can therefore make an accurate projection on the order of products to fulfil the demand of the vending machine 100. The owner 106 can also know the demands of the buyers 90 at certain locality of vending machines. For example, vending machines located near sports venues will demand more beverages compare to vending machines at food courts.

For buyer 90 using a membership card for payment, the vending machine 100 communicates with the owner of the vending machine 100 and a payment gateway 104 (Master- Card, VISA, NETs) and the via the service provider 102. The service provider 102 mentioned herein is a private or government owned body that provides communication channels, for example, cables, optical fibres, and hardware equipment to enable the communication between remote parties.

The applicator 168 is located near the collection chute 118 before the purchased product is collected by the buyer 90. The applicator 168 is connected and controlled by the controller unit.

The chassis provides a protection of the products and parts against the external elements, for example, dust, water and pilferage by man and animal. The front panel door 122 provides an access for the replenishment of products and maintenance of the vending machine 100. The front panel door is secured by a lock and key. The louvre which is at the back panel of the vending machine 100 provides an air circulation. The front panel 110, the right side panel 114, the left side panel and the top panel provides an advertising channel for potential advertising companies.

The computer 148 having a processor (Intel i7 processor) provides the processing of instructions or algorithms for receiving inputs from the external input peripherals and generating an output response to the external output peripherals. The algorithm herein describes a process of detecting the availability of at least a product in the storage unit, a process of selecting the at least one product from a selection menu, a process of requesting for a payment using a myriad of payment modes, a process of dispensing the at least one product, a process of labelling the product, a process of product inventorising, a process of detecting the ambient temperature, a process of monitoring a buyer's 90 buying behaviour, a process of identifying the buyer's 90 facial features and a process of suggesting products based on the past buying behaviour and/or facial features.

The memory storage comprising a Random Access Memory (RAM) and a Read Only Memory (ROM) provides a temporary and permanent storage means for the processing of information and storing the processed information thereafter respectively. The other surface mounted electronic components provides the connections to enable the processor to receive inputs and generate outputs.

The external peripherals include input and output peripherals. One of the input peripherals includes a plurality of sensors which include photoelectric (light) sensors 150, temperature sensors 152, image sensors 154 and audio (microphone) sensors 156.

The photoelectric sensors 150 are located near the collection chute 118 providing the detection of the product. The photoelectric sensors 150 are also located at the channels 130 to detect the presence or absence of product so as to instruct the computer 148 to send a signal to replenish to a remote supplier or the owner of the vending machine 106 having a remote server.

The temperature sensors 152 are located in the storage unit providing a temperature reading of the internal vending machine 100 so as to maintain an appropriate temperature for the preservation of products. In a scenario of a power blackout causing the temperature in the storage unit to be undesirable for the storage of perishable food items, the computer 148 having an uninterrupted power supply will log down the time the power is off, the duration of the blackout and the temperature profile during the blackout so as to provide a basis to decide on the method of disposal (discard or carry on sales) of the products in the vending machine 100 when the power is resumed.

The temperature sensors 152 are also located along the external periphery of the chassis providing a temperature reading of the environment. The external temperature reading is to suggest relevant products for the buyer 90 in a hot weather or a cold weather if the option is available.

The plurality of image sensor 154 is commonly known as camera. The top camera unit 300, the middle camera unit 302 and the bottom camera unit 304 are visible at the front panel 110. The top camera unit 300 is positioned at the high point to capture the top section of the buyer 90. The middle camera unit 302 captures the middle section of the buyer 90. The bottom camera unit 304 captures the lower section of the buyer 90. This is presumed that the buyer 90 is an adult with an average height of more than 1.5 metres. The camera units 300, 302, 304 are capable to reposition the viewing angle in particular, a pitch by pivoting at their respective horizontal axes and a yaw by pivoting at their vertical axes. The camera unit 300, 302, 304 can be an Intel® RealSense® 3D (three-dimension) camera.

Each of the top camera unit 300, the middle camera unit 302 and the bottom camera unit 304 comprises a RGB (Red Green Blue) camera (infrared camera) and a VGA (Video Graphic Array) camera (conventional camera) positioned in a horizontal plane. Adjacent to each camera unit 300, 302, 304 is an infrared laser projector and a plurality of audio sensor (microphones).

The infrared laser projector projects a grid onto the scene (in infrared light which is invisible to the human eye). The infrared image sensor (infrared RGB camera) records the grid of the scene to compute the depth information. The plurality of audio sensor (microphones) provides localizing sound sources in space and performing background noise cancellation.

The infrared components provide a means for facial tracking, facial recognition and gesture tracking. The RGB camera can scan the environment from 0.2 metres to 1.2 metres. The fixed focal length camera supports up to 1080 pixels at thirty frames per second (fps) capture in RGB with a seventy-seven-degree field of vision. The RGB camera lens has a built in infrared cut filter or heat-absorbing filters to reflect or block mid-infrared wavelengths while passing visible light.

The 640×480 pixel VGA camera (conventional camera) has a frame rate up to sixty frames per second with a ninety-degree field of view. The lens has an Infrared band pass filter.

The image sensors 154 provides an acquisition of a plurality of facial features of the buyer 90. The acquired image provides an image capture of the buyer 90, the gender of the buyer 90 and the ethnicity of the buyer 90. Some of the visible image sensors 154 are located at the front panel 110 namely the top camera unit 300, the middle camera unit 302 and the bottom camera unit 304. The three latter cameras are used for face tracking, facial recognition and gesture tracking.

The image sensor 154 is used in an optical fingerprint reader. The optical fingerprint reader provides a finger sensing area which is located adjacent to the reader module 124. Alternatively, the tactile display screen 120 can also provide a sensing area using the capacitive detection of the fingerprint of the buyer 90. The reading of the fingerprint provides a biometric identification of the buyer 90. The verified identity of the buyer 90 allows the computer 148 to retrieve the past transactions, to record the current transaction and to effect the payment completing the transaction.

The audio sensor 156 which is a microphone provides an acquisition of a voice of the buyer 90 for receiving a purchase request through the voice or other sound activated commands.

Another external peripheral is the tactile display screen 120 providing an input channel for selecting at least a product from a menu or for entering a new buyer's 90 personal information or for making payment. The tactile display screen 120 also provides an output channel for displaying a menu of products, a transaction progress and also advertisements when the transaction is not in progress. The tactile display screen 120 is also an input and an output peripheral.

Another external peripheral is the reader module 124 providing a contactless payment unit for cash card, credit card, electronic ticket with a smart chip attached and smart phones 108 using Near-field Communication (NFC). Data is exchanged between the smart cards or the smart phone 108 and the reader module 124 when they are within 10 centimetres from each other.

The number keypad 126 provides a rubber keypad for the entering of PIN (personal identification number) for buyers 90 who are using payment cards that require the entering of PIN.

The tactile display screen 120, the reader module 124 and the number keypad 126 are located at about 1.2 metres to provide access for most heights of the buyers 90 including children and the buyers 90 who are wheelchair bound. The tactile display screen 120 also provides an advertising channel when the vending machine 100 is idling.

NFC is a set of short-range wireless technologies, typically requiring a separation of 10 centimetres or less. NFC operates at 13.56 MHz on ISO/IEC 18000-3 air interface and at rates ranging from 106 kbit/s to 424 kbit/s. Near-field communication uses magnetic induction between two loop antennas located within each other's near field, effectively forming an air-core transformer. It operates within the globally available and unlicensed radio frequency ISM (Industrial, Scientific and Medical) radio band of 13.56 MHz. Most of the RF energy is concentrated in the allowed ±7 kHz bandwidth range, but the spectral mask for the main lobe is as wide as 1.8 MHz. NFC operates in two modes typically passive and active.

The reader module 124 operates in the passive mode which provides a carrier field and the target device in this case is the smart phone 108 answers by modulating the existing field. In this mode, the smart phone 108 may draw its operating power from the initiator-provided electromagnetic field, thus making the smart phone 108 a transponder. The same applies for smart cards transactions. NFC employs two different codings to transfer data. However, in the current example, the smart phone 108 transfer data at 106 kbits/s, a Manchester coding is used with a modulation ratio of 10%.

There are three payment modes provided by the vending machine 100. The first payment mode is by using cash typically notes and coins. The second payment mode is by using NFC technology typically a smart phone 108 or by card having a smart chip with antenna embedded. The third payment mode is the by inserting the payment card with EMV (Europay, Mastercard and Visa) chip into a payment terminal which required the entering of PIN.

Another external peripheral apart is the communication module 162 comprising a network interface card (NIC) 164 and a USB (Universal Serial Bus) 166 serial port. The NIC 164 provides a communication between the vending machine 100 to a computer network either by using cables or wirelessly. The NIC 164 is both a physical layer and data link layer device, as it provides physical access to a networking medium and, for IEEE 802 and similar networks, provides a low-level addressing system through the use of MAC addresses that are uniquely assigned to network interfaces. The USB 166 serial port provides a connection for a thumb drive access.

The printer 158 provides a printing of the QR code on a sticker paper for providing a web link in which the buyer 90 can scan the QR code using his or her smart phone 108 camera to obtain information of the product purchased and/or to get incentives.

The print engine can be taken from an industrial table top printer, it can be a specifically designed module that can be attached onto the applicator 168 or it can be a proprietary element constructed by the printer applicator manufacturer. A print engine's primary provides the receipt of data from the computer 148 and print the data onto a label for application. This printing can be accomplished using either the direct thermal method or the thermal transfer method. Both methods heat up very fine elements (up to 600 per inch) on a print head. Direct thermal burns the image onto the face of specially designed label stock. The thermal transfer process utilizes a ribbon coated with wax, resin, or a hybrid of the two. The label stock is then heated and melted onto the surface of the label substrate. The printer 158 knows what to print via data communication from an outside software package, much like common inkjet printers. The software delivers data formatted in a specific layout and the printer 158 reads the format based on its own driver.

The applicator 168 provides a means for adhering the printed sticker onto the product. The applicator 168 specifically an applicator sticker machine provides an automated labelling onto the purchased product before the collection by the buyer 90. The label contains information on contents, best before date, country of origin et cetera as well as a Quick Response code. The label complies with specific standards such as those of GS1 (GS1 is a not-for-profit organisation that develops and maintains global standards for business communication. The best known of these standards is the barcode, a symbol printed on products that can be scanned electronically) and Universal Product Code (U.P.C).

The applicator 168 section delivers the label to the product. This can be accomplished by several methods. The label application is achieved with a pneumatic or electric cylinder with a specially designed label pad. The cylinder will extend out and touch (tamp) the adhesive side of the label to the product. Alternative applications include extending the cylinder and then use air to blow the label to the product surface (tamp-blow). Still, another popular method is a blow-on system that will use a burst of air to deliver the label from the pad to the product surface without the use of a cylinder. Other methods can be used to wipe a label onto a surface, or even place two duplicate or unique labels on different sides of a product.

FIG. 3 illustrates the channel of the storage unit. The storage unit provides a space for storing of products in the different levels 128 where each level 128 is further compartmentalized by different channels 130. In each channel 130, a tray 135 is used to provide the carrying of the products. Partitions 132 are used to segregate between channels 130. The partition 132 provides a vertical wall guide for stabilizing as the products travel along the channel 130. The couplers are located at the rear of each level 128. They are electrical connectors that are attached to the channels 130 at the rear and hence providing the electrical signal and the electrical power to drive the conveyor belt 136 and the coil 134. The electrical connector provides data transfer to the computer 148 for tracking the products. The levels 128 are stacked above on top of each level 128.

In the embodiment, there are four levels 128. The highest level 128 comprising three channels 130 providing a conveyor belt dispensing mode. The level 128 below the highest level comprising three channels 130 providing a coil 134 dispensing mode.

The tray 135 provides a modular insertion and extraction to the channel 130. The conveyor belt system or the coil system can be installed on the tray 135 and inserted into the channel 130 by coupling with the coupler at the rear end of the channel 130.

The conveyor belt 136 provides a longitudinal rotating belt which transport the product forward. The conveyor belt system comprises at least two pulleys at both ends namely a tail pulley and a drive pulley which is driven by the motor. The gap between the two surfaces of the conveyor belt 136 provides a strip 139 of photoelectric sensors 150. Each product on the conveyor belt 136 is separated by a separator to demarcate a slot 137. The separator ensures that only one product is dispensed at a time. The sensors are located at equidistant from each other along the strip 139. The sensors detect a light disruption and consider a product is present. Conversely if the light were not disrupted, it would imply that there is no product at that particular slot 137. The strip 139 is a like a breadboard that provides easy addition and replacement of photo sensors. If there were more products, more photo sensors can be added along the strip 139.

The coil 134 provides a longitudinal rotating coil 134 that spirals along the longitudinal axis. The product is placed in between the coil 134 pitch. The wide pitch can hold a wider dimension like a bottle while a narrow pitch can hold products that has a rather flat packaging like potato chips. Similar to the conveyor belt 136, photo sensors can be added at the bottom of the tray 135.

The drive assembly 160 of the dispensing unit located at the rear of each channel 130 providing motors for rotating the coils 134 and the conveyor belt 136. There are photoelectric sensors 150 at the front of the channel 130 to detect the dislodgement of the product from the channel 130. Upon detection of a disruption of the light, the motor will stop rotating.

The one arm elevator provides a transport of the product from the conveyor belt 136 or the coil 134 to a trough of the elevator arm 138. The elevator is slightly inclined to assist in the delivery of the product. The elevator arm 138 through the pulley system travels between the levels 128 and delivering the product at the collection chute 118. The elevator arm 138 has the advantage of delivering products gently to the collection chute 118 in particular fragile products.

The vending machine 100 provides a method of tracking a gesture of the buyer 90 specifically the eye using the at least one camera 300, 302, 304 comprising the steps of first, tracking or locating the face of the buyer 90 to ensure a real human is present. The algorithm tracks the face containing the features of two eyes, one mouth, one nose and two ears set in an elliptical shaped frame. At this juncture the identity of the buyer 90 is not established. Secondly, the location of the eyes is identified by using a relative distance from the forehead or periphery of the elliptical shaped frame. Thirdly, the eye focus is determined by detecting the presence of the sclera and an iris from the captured image. For example, if the buyer were to glance to the left side, the right side sclera will be more obvious compare to the left side sclera as the iris is shifted to the left side. Fourthly, to effect a selection, the buyer 90 has to blink two times in rapid succession by looking at the product on the tactile display screen 120. The current method enables a handicap person or wheelchair bound person to make a purchase without moving using his or her arm.

The vending machine 100 provides a method of tracking a gesture of the buyer 90 specifically the body movement like hand gesture using the at least one camera 300, 302, 304 comprising the steps of first, locating the face of the buyer. This is to ascertain that a human buyer is standing in front of the vending machine 100. An approximate estimation of the body parts of the buyer 90 are identified taking reference from the face. Assuming that the buyer 90 is physically abled, a second step is to identify the position of the hands and tracked. The buyer 90 can articulate his selection by moving his one hand, either a left hand or a right hand without touching the tactile display screen 120. By simply, expressing a pointed finger, the buyer 90 can select and confirm his selection. The buyer 90 can also scroll between selection by moving his finger left or right, up or down in the conical line of sight 306.

Below is a list of possible hand gestures and its corresponding commands supporting the latter method:

A pointed finger suggests a selection; An open palm that eventually ends in a clenched first in a time of one second or less suggests a confirmation. From a clenched first to an open palm suggests abandoning the selection or deselect. In other words, a gripping and a non-gripping motion; A sweeping motion of the hand or pointed finger to the left suggests scrolling the current page to the left. Conversely, a sweeping motion of the hand to the right suggests scrolling the current page to the right; A sweeping motion of the hand or pointed finger upwards suggests scrolling the current page upwards. Conversely, a downward sweep of the hand suggests scrolling the current page downwards; A plurality of outstretched fingers presumably four and a one thumb suggests an expanded view. Conversely, the four fingers and the one thumb gather in a point suggests a minimized view.

The computer 148 having the memory storage has all the possible gestures of the eye, the hand, the human body so as to accurately interpret each gesture with the corresponding command. Additionally, the identification of the gestures can also be used to interpret the emotional state of the buyer 90. For example, anger, anxious, happy.

The vending machine 100 provides a method of interpreting the voice into a list of corresponding command comprising the steps of first identifying the harmonics of the human voice through the microphone. The voiced speech of a typical adult male will have a fundamental frequency from 85 Hertz to 180 Hertz, and that of a typical adult female from 165 Hertz to 255 Hertz. Thus, the fundamental frequency of most speech falls below the bottom of the "voice frequency" band (300 Hertz to 3,000 Hertz). However, enough of the harmonic series will be present for the missing fundamental to create the impression of hearing the fundamental tone.

Secondly, matching the harmonics with the saved harmonics in the memory of the computer 148. Thirdly, interpret the harmonics to the corresponding command. For example, changing the display on the tactile display screen 120 to reflect the prospective buyer's 90 product preference.

The gesture and voice recognition have not specifically delved into the identity of the buyer 90. They are simply to interact with the prospective buyer 90 standing in front of the vending machine 100.

The facial identification of the buyer 90 is made possible if either the buyer 90 has registered with the vending machine 100 or the computer 148 has the computing prowess to search the Internet via the service provider 102 at high speed searching for a matching facial features of the unregistered buyer. The latter identification process is time consuming and assuming the unregistered buyer has left his or her photo identity on the Internet or leave a significant digital footprint on the Internet. To simplify the search, the unregistered buyer could enter his name guided by instructions on the tactile display screen 120. More information provided will simplify the search. The search can extend to social media like Facebook, Instagram, Pinterest, Google Plus et cetera.

Figure 4:
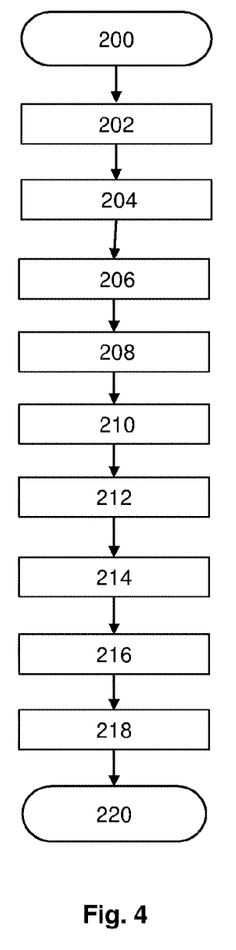
FIG. 4 illustrates a process of registering a new member using a tactile display screen.

FIG. 4 illustrates a process of registering a new member using the vending machine tactile display screen 120. The vending machine 100 provides a method of registering a new member. In the new member registration 200, the new member 90 touches a button on the tactile display screen 120 on the vending machine 100 that indicates a "New Member" 202. An online form is fetched from the remote server via the network and is displayed prompting for a first name 204, a last name 206, a gender (male/female) 208, a date and year of birth 210, a smart phone number 212 and an electronic mail address 214. The new member's facial features are recorded by the top camera unit, 300, the middle camera unit 302 and the bottom camera unit 304. The new member's voice is also recorded by the microphone 156. The tactile display screen 120 will display a sentence and expect the new member to recite. For example, "Hello John, you look great". The sentence structure contains vowels and consonants that covers most of the English phonetics as well as the vocal range of the new member. For other languages, the computer 148 has to be updated accordingly.

The completed form is submitted 216 and transmitted via the network to the remote server of the owner 106. A membership card having NFC capability is dispensed from the vending machine 100. The membership card having the name of the registered member printed on one surface. The registration of the new member is completed 220 and is now a registered member.

The registration can be performed on a web browser on a desktop, a laptop, a smart phone, a tablet or a mobile application developed specifically for the smart phone. For new members who registered, an incentive is given as an appreciation by providing discount in the next transaction, for example, purchasing at least a product from the vending machine 100.

Figure 5:
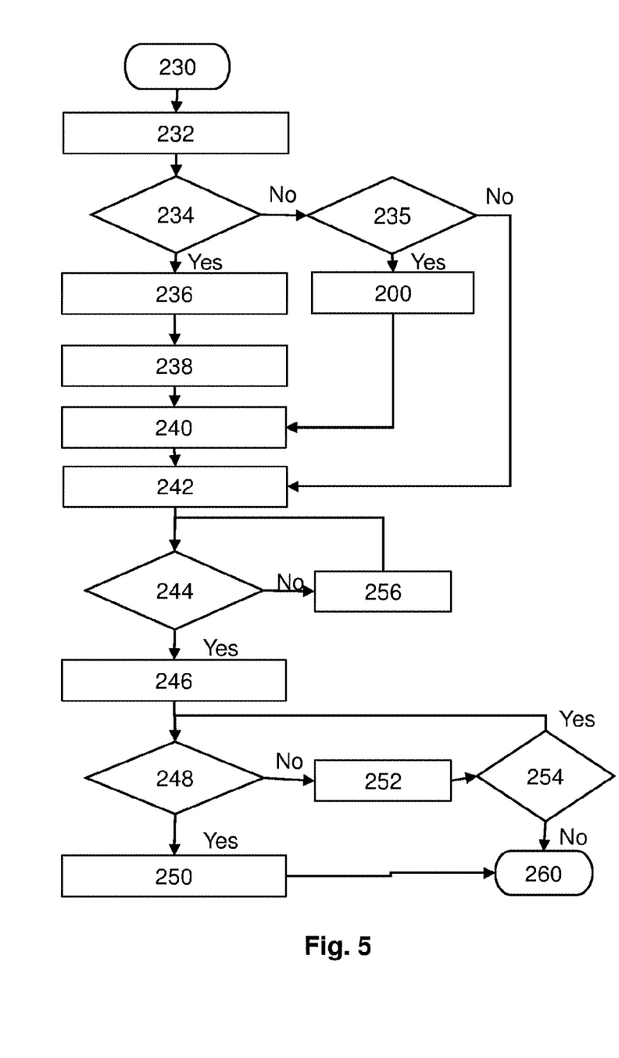
FIG. 5 illustrates a process flow of a registered member performing a transaction.

FIG. 5 illustrates a process flow of a registered member 90 performing a transaction. The registered member 90 begins to perform a transaction 230 by touching on the tactile display 232.

A message "Member?" with two buttons "Yes" and "No" 234 are shown on the tactile display screen 120. The registered member 90 selects "Yes" by touching the "Yes" button 236 on the tactile display screen 120. If the buyer 90 touched "No", a message "Do you want to register?" is displayed on the tactile display screen 120. If the buyer 90 persisted in not registering, the computer 148 will suggest products based on the ambient temperature and the facial features. For example, if the ambient temperature is 30° C., the computer 148 will suggest cold beverages. In addition, the camera will detect for a human face and process the acquired image to determine the gender of the buyer 90. If the buyer 90 were a man, the computer 148 may suggest a beer as beverage. Conversely, if the buyer were to register, the buyer 90 will be directed to the registration 200 as shown in FIG. 4.

The registered member 90 wave its smart phone 108 or membership card near the reader module 124. The registered member's 90 particulars are retrieved 238 from the remote server 106. Relevant ads are displayed 240 on the top and/or bottom pane of the tactile display screen 120. The ads relate to the registered member's 90 buying habits based on past shopping experience and also showing new product offerings relevant to the registered member 90. The remote server 106 returns with a result confirming the status of the member 90. The remote server 106 also suggests relevant products 242 relating to the registered member 90.

The computer 148 in the vending machine 100 waits for registered member to complete product selection on the selection menu 244. The product selected from the selection menu is stored into the storage 256 of the computer 148 for processing once the registered member 90 has confirmed his order (product selection and quantity).

The computer 148 in the vending machine 100 calculates the total amount payable 246. The tactile display screen 120 displays the total amount and presents the registered member 90 with three payment option namely cash, payment card requiring PIN or payment with NFC technology which includes smart phone 108 and card.

If the registered member 90 had settled the payment 248, the purchased products and the amount spent will be associated 250 with the registered member 90. After which, the transaction of the registered member 90 ends 260. Conversely, if payment were not made, a countdown timer will be initiated 252. During this counting down, if there were no activation 254 on the tactile display screen 120, the transaction will end 260.

The registered buyer 90 can also perform the transaction using gesture and voice if the biometric information is recorded and saved in the computer 148 at the vending machine or the biometric information is fetched from a remote server 106.

The vending machine 100 provides a method of detecting the availability of at least a product in the slot 137 of the channel of the storage unit comprising the following steps.

A plurality of photoelectric sensors 150 is mounted on a strip 139 at the trough of the tray 135. The strip 139 is below the conveyor belt 136. The conveyor belt 136 is specially constructed not to obstruct the light beam from the photoelectric sensors 150. It is a narrow belt in the centre of the tray 135. The strip 139 in this case can be mounted on the either sides of the tray 135 longitudinally. In the case of the coil dispensing, the strip 139 of photoelectric sensors 150 can be mounted below the coil 134. The detection of the presence of the product depends on the position of the photoelectric sensors 150.

The tray 135 with the products and the aligned sensors at the strip 139 is then inserted into the channel 130 of the storage unit. The coupler from the drive assembly 160 which is a female connector is connected to an electrical socket which is a male connector on the rear end of the tray 135. The connection comprising a power, a ground, a signal in and a signal out.

The signals from the photoelectric sensors 150 from each slot 137 in the tray 135 are sent to the computer 148 for counting as well as the other trays 135 in different channels 130 and different levels 128. A disrupted light beam of the photoelectric sensor 150 indicates that there is a product at the slot 137. If not disrupted, it would imply that the slot 137 is vacant. Another possible scenario is the photoelectric sensor 150 may be faulty and therefore the authorised personnel who is replenishing the product has to ensure that the final physical product count matches the count done by the computer 148. If the photoelectric sensor 150 is faulty, a replacement is easily made by pulling the faulty sensor from the strip 139 at the bottom of the tray 135 and replacing with an operating one.

The algorithm in the computer 148 can count the products in all channels 130 and all levels 128 but unable to identify the nature of the product and the brand. Therefore, authorised personnel have to manually enter the association, for example, Level 4, Channel 1 is brand "ABC", is a "fruit juice", and having a product description.

The vending machine 100 provides a method of entering a product specification for at least a product comprising the following steps.

Encoding the product specifications in a machine and human readable file, for example a XML (eXtensible Markup Language) file. The file is done off-site preferably at a fulfilment or warehousing centre. The file is in digital copy saved in a portable storage medium, for example a USB 166 (Universal Serial Port) thumb drive. Alternatively, the file can be transmitted to the vending machine 100 via a network from a remote server. The product specifications comprising a vending machine 100 code, a level 128, a channel 130, a slot 137, a universal product code (UPC), a product brand, a product price, a product best before date, a product origin and a product description. For example, the XML file contains the following structure:

```
<vending_12345>
    <level>1</level>
    <channel>1</channel>
    <slot>1</slot>
    <upc>123456789000</upc>
    <brand>CocoCola</brand>
    <product_type>beverage<product_type>
    <best_before>201706</best_before>
    <origin>Singapore</origin>
    <description>Coca-Cola is a carbonated soft drink produced by
    The Coca-Cola Company </description>
</vending_12345>
```

Subsequent products insertion into the XML file will follow the above structure.

The encoded file (XML) is loaded into the memory storage (hard disk) of the computer 148 through a communication port like a USB 166 serial port or through the network interface card (NIC) 164 which is connected to the network via cable or wireless router. Once the XML file is loaded, the algorithm in the computer 148 has the knowledge of all products in the storage unit including the level 128, the channel 130, the slot 137 and the product specifications.

The computer 148 will verify the information provided by the XML file by performing a count of all the slots 137 in the storage unit through the plurality of sensors. There are infrared sensors mounted on the strip 139 as well to scan for the UPC. Alternatively, mobile cameras 154 installed above the trays 135 are able to slide longitudinally along the channels 130 and are used to acquire images of the products.

The acquired images are processed and verified by comparing with the stored information at the computer 148. The image recognition of the product primarily seeks out a logo on the package, the dimensions of the package et cetera.

The vending machine 100 provides a method of selecting the at least a product comprising the following steps.

A selection menu is displayed on the tactile display screen 120. The product is selected by the buyer 90 using the tactile display screen 120. The quantity of the product is also selected. The computer 148 prompts buyer 90 for more order on the tactile display screen 120 by a push button "Yes" or "No". If the buyer 90 selects "Yes", the selection menu will be presented again. This iteration will continue whenever the buyer 90 touches the "Yes" button on the tactile display screen 120 screen. Conversely, if the buyer 90 pushed "No", the total cost of the product will be computed and displayed. The next step is to confirm payment. Once the payment is confirmed, the purchased product will be dispensed and stored in the memory storage associating with the buyer 90 providing data for product suggestion in the next purchase.

The vending machine 100 provides a method of requesting payment comprising the following steps.

Presenting a payment button whereby the buyer 90 touches the button on the tactile display screen 120. The consolidated cost of the order is shown with applied tax or any other charges if any. The next step is to prompt the buyer 90 for a preferred payment option, for example, cash, card or phone. If the buyer 90 chose cash, the cash depositing unit with light emitting diodes will flash to indicate the place to deposit the notes or coins. Change will be returned if any. Other payment options using card could either use a payment card terminal for card insertion or a reader module 124 which uses NFC for contactless card payment or smart phone 108 payment. The card can be credit card, debit card or card with smart chip (EMV chip).

An alternative payment method using facial recognition comprising the steps of first scanning for a human face in front of the vending machine 100. Secondly, determining the human face as a registered buyer 90 by searching at its remote server 106 owned by the vending machine owner. If the buyer's identity is confirmed, the total amount of the product purchased at the vending machine 100 will be deducted from the remaining value of the buyer's account. If there were not enough value in the account. The transaction will be terminated. A message will be displayed on the tactile display screen 120 "Insufficient value detected" accompanied by an audible alarm projected from the speakers. Conversely, if there were sufficient value in the buyer's 90 account the remaining value will be reduced and the transaction approved. Thirdly, a positive result is returned to the vending machine 100. The tactile display screen 120 then displays "Payment made. You have $3.00 remaining in your account."

The current payment option is assumed that the vending machine 100 has an upfront payment policy at the point of first sales. In other words, the registered buyer 90 has to buy a stipulated amount of value in the account like twenty dollars to kick start the purchase.

The vending machine 100 provides a method of dispensing the at least one product comprising the following steps.

Receiving the selection of the product from the buyer 90 via the tactile display screen 120. The relevant channel drive assembly 160 is activated. The elevator arm 138 is activated and travel to the relevant level 128. The photoelectric sensor 150 located at front of the channel 130 detects for light disruption to indicate the product has been dispensed from the tray 135 into the trough of the elevator arm 138. The elevator arm 138 is then levelled with the collection chute 118 and the buyer 90 can collect the product.

The vending machine 100 provides a method of labelling and tracking the product comprising the following steps.

The product is selected on the selection menu on the tactile display screen 120. The product selection is received by the computer 148. The QR code is printed on an adhesive medium, for example a sticker. The printer 158 can be a laser printer. The adhesive medium is then adhered onto the product at the collection chute 118 by an applicator 168. At the same time, the product specifications are displayed on the tactile display screen 120 screen. The QR code is also displayed on the tactile display screen 120. Additional information is also displayed on the tactile display screen 120 comprising a dispensed date and time and a current slot number at the point of sales. The current slot number may differ from the slot number as saved in the XML file as the conveyor or the coil 134 could have moved. For example, when a product is dispensed with a slot number of "1", the product having a slot number of "2" at the back will move forward to take the dispensed product's position. The back product used to have a slot number of "2" now has a number of "1".

The QR Code obviates the need for a user to type it into a web browser. A smart phone 108 is used as a QR code scanner, displaying the code and converting it to some useful form such as a standard URL for a website. Buyers 90 with a camera phone equipped with the correct reader application can scan the image of the OR code to display text, connect to a wireless network, or open a web page in the telephone's browser. The act of linking from physical world objects is termed hardlinking or object hyperlinking.

The QR code that is adhered to the product or the package of the product provides the same information as displayed on the tactile display screen 120. However, the information is displayed on the smart phone's 108 browser by scanning the OR code using the smart phone 108. The QR code directs the browser to a website of an interested business owner who owns the vending machine 100 or some other websites that have vested interest. The QR code can also be linked to a location to track where a code has been scanned, for example, the location of the vending machine 100. Either the application on the smart phone 108 scans the QR code retrieves the geo information by using GPS (Global Positioning System) and cell tower triangulation (assisted GPS) or the URL encoded in the QR code itself is associated with the location.

The guided website by the QR code can also update its inventory at the remote server of the vending machine 100 that is dispensing the product. The updated inventory can be matched with the inventory at the vending machine 100.

The vending machine 100 provides a method of inventorizing comprising the following steps.

The product inventory is checked at the storage unit by the counting the light sensors that are disrupted at the slots 137 at the different channels 130 at certain time of the day with the foreknowledge of the product in each tray 135. The time of day to make an inventory of the storage unit is set by the authorised personnel. The time preferably be set at off peak hours or where the sales of product is low. The stock level of the storage unit may also be taken on demand instead of time based. The authorised personnel at the vending machine 100 can retrieve the information while there or the remote server could access any time.

The network connection is established to provide communication with the remote server. The communication is to provide the status of the product inventory of the vending machine 100.

The vending machine 100 provides a method of detecting the ambient temperature for product suggestion comprising the following steps.

The temperature sensors 152 are located at the periphery of the chassis. At least one temperature sensor is located at the base of the chassis and at least one temperature sensor is at the top of the chassis. The readings from the temperature sensors 152 are acquired and an average reading of the two temperature inputs are computed by the computer 148. The result may be used to suggest product to the buyer 90. For example, if the average ambient temperature is 30° C., the computer 148 will suggest a cold beverage to the buyer 90.

If the ambient temperature is 20° C., the computer 148 will suggest a hot beverage to the buyer 90.

The vending machine 100 provides a method of monitoring the buyer's 90 buying behaviour comprising the following steps.

In order to monitor the buyer's 90 buying behaviour, personal particulars have to be collected. The computer 148 through the tactile display screen 120 acquires the particulars of the buyer 90 including a photo image and a voice recording. The particulars of the buyer 90 comprising a first name, a last name, a gender, a smart phone 108 number, an electronic mail address and a date of birth. The purpose of storing a photo image and a voice recording is to prevent fraudulent use of the registered buyer's 90 account. In particular, if the vending machine 100 business model were to issue a membership card with cash value in the card. The loss of the membership card equates to a loss in monetary value. Another reason for the collection of photo image is for data analysis in the facial recognition and voice recognition.

The submission of the buyer's 90 personal particulars is stored in the computer 148 or at a remote cloud with a flag to highlight that the buyer 90 is a newly registered member and is entitled to a discount for the next purchase.

Incentive is given to the registered buyer 90, for example, a cash discount for any product purchased in the next purchase. However, the buyer 90 has to scan the QR code displayed on the tactile display screen 120 or the QR code adhered on the surface of the product after the purchase.

Information on the purchased product by the buyer 90 is also stored in the computer 148 or at a remote cloud. The information of the product which is the product specifications and other additional information like the current slot number and the dispensed date and time are stored. The buyer 90 and the purchased product are associated by the computer 148 algorithm.

For subsequent transactions by the buyer 90, the computer 148 retrieves information of the buyer 90 based on the facial or voice or both to commence transaction or scanning a membership card or smart phone 108 with NFC technology on the reader module 124.

The vending machine 100 provides a method of identifying the buyer's 90 facial features comprising the following steps.

The buyer's 90 facial features are acquired from the photo image comprising the two eyes, a nose and lips. A plurality of images is scanned and detected for the mentioned features. The computer 148 algorithm finds the position of the eyes based on the colour contrast between the sclera (white of the eye) and the surrounding skin. Once detected, the length of each eye is found, the distance between the two eyes are found and the distance from first distal end of the first eye to the second distal end of the second eye can be computed. The algorithm also finds the nose from the acquired image based on the distance relative to the eyes by looking for a colour contrast of the nostril and ala. The algorithm also finds the lips from the acquired image by detecting the lateral commissure or the two corners of the lips. To improve the feature recognition, the shape of the face and the facial hair are detected to identify the gender of the buyer.

The vending machine 100 provides a method of suggesting products based on the past buying behaviour and/or facial features and/or ambient temperature comprising retrieving past purchased products and suggesting the same product item.

In the application, unless specified otherwise, the terms "comprising", "comprise", and grammatical variants thereof, intended to represent "open" or "inclusive" language such that they include recited elements but also permit inclusion of additional, non-explicitly recited elements.

As used herein, the term "about", in the context of concentrations of components of the formulations, typically means +/−5% of the stated value, more typically +/−4% of the stated value, more typically +/−3% of the stated value, more typically, +1-2% of the stated value, even more typically +/−1% of the stated value, and even more typically +/−0.5% of the stated value.

Throughout this disclosure, certain embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

REFERENCE NUMERALS 90 buyer, new member
100 vending machine
102 service provider
104 payment gateway
106 remote server of the vending machine owner
108 smart phone
110 front panel
112 top panel
114 right side panel
116 length of the vending machine
118 collection chute
120 tactile display screen
122 front panel door
124 reader module
126 number keypad
128 level
130 channel
132 partition
134 coil
135 tray
136 conveyor belt
137 slot
138 elevator arm
139 strip
142 storage unit
144 dispensing unit
146 power bank
148 computer
150 photoelectric sensor
152 temperature sensor
154 image sensor, camera
156 audio sensor, microphone
158 printer
160 drive assembly
162 communication module
164 Network Interface Card NIC
166 Universal Serial Bus USB
168 applicator
200 starting of new member registration
202 touching "New Member" button
204 entering first name
206 entering last name
208 entering gender
210 entering date and year of birth
212 entering mobile number
214 entering email
216 updating the server
218 dispensing membership card
220 end of new member registration
230 starting of a registered member transaction
232 touching screen to initiate
234 member?
235 Do you want to register?
236 waving smart phone or membership card at reader module
238 retrieving registered member's particulars
240 displaying relevant ads
242 suggesting relevant products
244 member finished shopping?
246 calculating total amount
248 payment settled?
250 associating purchased products with the buyer
252 initiating count down timer
254 any response from the buyer?
256 storing selection into computer storage
260 end of a registered member transaction
300 top camera unit
302 middle camera unit
304 bottom camera unit
306 conical line of sight

The invention claimed is:

1. A vending machine comprising:
a shelf for holding goods;
an automatic payment terminal connected to the shelf for receiving payment of selling the goods;
at least one biometric reader that is connected to the automatic payment terminal for performing electronic bill payment of the goods;
a communication unit that is connected to the shelf, the automatic payment terminal and the at least one biometric reader for transferring data between the vending machine and a remote computer; and
a recorder for recording stock of the goods;
wherein the communication unit comprises a unique electronic address for identifying the vending machine, the automatic payment terminal or both;
wherein the unique electronic address is associated with characteristics of the vending machine or the goods;
wherein the recorder comprises a label dispenser for providing labels to the goods;
wherein the label dispenser comprises a matrix barcode printer for presenting a matrix barcode to at least one of the goods; and
wherein the matrix barcode includes information related to date of expiry of the product, user guide of the product and packaging disposal information of the product.

2. The vending machine of claim 1, wherein the at least one biometric reader comprises a facial recognition system for identifying the user.

3. The vending machine of claim 2, wherein the facial recognition system comprises an illuminator for identifying the user in the night.

4. The vending machine of claim 1 further comprising a computer connected to the at least one biometric reader, the computer having a customer relationship management program for receiving personal identification information of the user from the least one biometric reader.

5. The vending machine of claim 1, wherein the shelf comprises an ejector for releasing the goods automatically after clearing payment at the automatic payment terminal.

* * * * *